(12) United States Patent
Shon et al.

(10) Patent No.: US 6,268,597 B1
(45) Date of Patent: Jul. 31, 2001

(54) MICROWAVE OVEN

(75) Inventors: Jong-Chull Shon; Tae-Soo Park, both of Suwon; Joon-Young Jeong, Seoul; Bo-In Jang; Dong-Bin Lim, both of Suwon; Won-Woo Lee, Ansan, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/480,692

(22) Filed: Jan. 11, 2000

(30) Foreign Application Priority Data

Jan. 14, 1999 (KR) .................................................. 99-762
Jul. 7, 1999 (KR) ................................................ 99-27329

(51) Int. Cl.$^7$ ....................................................... H05B 6/68
(52) U.S. Cl. ........................... 219/709; 219/704; 219/748
(58) Field of Search .................................. 219/678, 690, 219/696, 702, 704, 709, 712, 745, 746, 748, 728

(56) References Cited

U.S. PATENT DOCUMENTS

| 3,412,227 | * 11/1968 | Anderson | 219/678 |
| 4,097,708 | * 6/1978 | Bickel | 219/704 |
| 4,303,818 | 12/1981 | Smith . | |
| 4,520,250 | * 5/1985 | Ishihara et al. | 219/709 |
| 5,378,875 | * 1/1995 | Hirama et al. | 219/705 |
| 6,166,364 | * 12/2000 | Ha | 219/709 |

FOREIGN PATENT DOCUMENTS

2 520 160   7/1983  (FR) .

* cited by examiner

*Primary Examiner*—Tu Ba Hoang
(74) *Attorney, Agent, or Firm*—Robert E. Bushnell, Esq.

(57) ABSTRACT

A microwave oven has a stationary wave magnetic field detecting device. The microwave oven includes an antenna sensor having a loop portion which is protruded into a waveguide of the microwave oven, and a wire whose one end is grounded at the waveguide, wherein the wire of the antenna sensor is grounded at an outer side of the waveguide.

8 Claims, 6 Drawing Sheets

MICROWAVE OVEN

CLAIM OF PRIORITY

This application makes reference to, incorporates the same herein, and claims all benefits accruing under 35 U.S.C. §§ 119 from an application for Microwave Oven earlier filed in the Korean Industrial Property Office on Jan. 14, 1999 and there duly assigned U.S. Ser. No. 99-762, and an application for Microwave Oven earlier filed in the Korean Industrial Property Office on Jul. 7, 1999 and there duly assigned U.S. Ser. No. 99-27329.

BACKGROUND OF THE INVENTION

1. Field of the Invention

The present invention relates to a microwave oven having a stationary wave magnetic field detecting device.

2. Description of the Prior Art

Generally, a microwave oven cooks food by using microwaves, and the intensity of the microwaves generated from a magnetron of the microwave oven is varied in accordance with characteristics of the cooked food. That is, various factors of the food such as material, shape, etc. of the food determine microwave absorption and the magnitude of microwave energy. Accordingly, the microwave oven usually performs the cooking operation after analyzing the status of the food by various sensors.

FIG. 1 schematically shows a magnetic fluid detecting device of a conventional microwave oven.

As shown in FIG. 1, the conventional microwave oven includes a magnetron MGT for generating microwaves of approximately 2450 MHz, a waveguide 10 for transmitting the microwaves generated from the magnetron MGT into a food 11 in a cooking chamber 2, and a magnetic field detecting device 100 for detecting the cooking status of the food 11 by receiving electromagnetic waves reflected through the waveguide 10.

The magnetic field detecting device 100 includes an antenna sensor 101, a diode D, and a shield member 120. The antenna sensor 101, the diode D, and the shield member 120 are fixed on a wall of the waveguide 10, in a manner that the antenna sensor 101 is protruded inside the waveguide 10.

The diode D is connected with an end of the antenna sensor 101, to apply the detected voltage of the stationary wave received from the antenna sensor 101 to a microcomputer 130, and the microcomputer 130 determines the cooking status of the food 11 by the detected voltage of the stationary wave received through the diode D.

FIG. 2 is a view for explaining the operating principle of a conventional magnetic field detecting device. As shown in FIG. 2, the end of the antenna sensor 101 is grounded on an inner wall of the waveguide 10 by welding, and has 0 (zero) degree of electric potential, while another end of the antenna sensor 101 is connected with the diode D through an inserting hole 10a of the waveguide 10.

Further, in order to have a predetermined sectional area A between the waveguide 10 and the antenna sensor 101, a certain portion of the antenna sensor 101 forms a semicircular loop. Through the predetermined sectional area A formed in the loop of the antenna sensor 101, a magnetic flux, which is formed by the stationary wave reflected into the waveguide, passes.

Meanwhile, the microwaves generated from the magnetron MGT are radiated in the form of an electromagnetic wave, and the combination of the microwaves advancing into the cooking chamber 2 from the waveguide 10, and the microwaves reflected from the cooking chamber 2 into the waveguide 10 forms the stationary wave in the waveguide 10.

Here, the voltage is induced from the antenna sensor 101 as follows: When the magnetic flux formed by the stationary wave in the waveguide 10 passes through a predetermined sectional area A formed between the waveguide 10 and the antenna sensor 101, the magnetic flux density B generated in the loop in the antenna sensor 101 is obtained by the following formula 1:

$$B = \phi/A \tag{1}$$

Further, the electromagnetic wave is a function of time, and the magnetic flux density B induced at the sectional area A in the antenna sensor 101 is accordingly varied in magnitude in accordance with the time. Accordingly, by the Maxwell equation, the voltage induced to the antenna sensor 101 can be obtained by the following formula 2:

$$E = -dB/dt \tag{2}$$

FIG. 3 shows a voltage switching section of the magnetic field detecting device shown in FIG. 1. As shown in FIG. 3, an anode of the diode D is connected to the antenna sensor 101, and a cathode of the diode D is connected with an electrolytic capacitor C being connected in parallel relation with a resistor R, forming a closed circuit.

The diode D detects the voltage in accordance with the stationary wave of the antenna sensor 101, and the electrolytic capacitor C smooths the detected voltage into a predetermined voltage which is outputted as an output voltage Vout by a voltage drop generated at both ends of the resistor R.

By employing the magnetic field detecting device having such an antenna sensor, the conventional microwave is enabled to adjust to the various cooking environments which are varied in accordance with the shape or material of the food when cooking the food, so that the detection error of the sensor is reduced and the cooking status of the food is precisely detected.

The antenna sensor of the magnetic field detecting device employed in the conventional microwave oven, however, has a problem as follows. As shown in FIG. 2, one end of the antenna sensor is grounded on the inner wall of the waveguide by welding, while the other end thereof is connected with the diode, the electrolytic capacitor and the resistor, respectively, by being extended outside the waveguide, to be connected with an input wire. Accordingly, various processes such as a process of fixing the antenna sensor, a process of connecting respective circuit elements to the antenna sensor, etc., need to be performed repetitiously. As a result, the working process becomes complicated, disturbing the automation or mass-production of the microwave oven, and deteriorating the productivity.

Further, in the microwave oven having the conventional magnetic field detecting device, the antenna sensor fixing locations can not be precisely controlled with respect to the waveguide, so that there are uneven sectional areas formed in the loops of the antenna sensors, and the exact voltage value can not be detected by the antenna sensor.

Further, the fixed portion of the antenna sensor fixed on the wall of the waveguide by welding is chemically deformed or snapped off by the long and repetitious use thereof, resulting in a deteriorated reliability about the detected stationary wave data.

SUMMARY OF THE INVENTION

The present invention has been developed to overcome the above-mentioned problems of the prior art, and accordingly, it is an object of the present invention to provide a microwave oven having improved reliability about detected data by an improvement in an antenna sensor structure and an installation of a magnetic field detecting device.

The above object is accomplished by a microwave oven according to the present invention, including an antenna sensor having a loop portion which is protruded into a waveguide of the microwave oven, and a wire whose one end is grounded at the waveguide, wherein the wire of the antenna sensor is grounded at an outer side of the waveguide.

Preferably, the microwave oven according to the present invention further comprises a shield member for fixing the antenna sensor in a manner that the loop portion of the antenna portion is protruded into the waveguide, and for fixing one end of the wire in a manner that the one end of the wire is grounded at the outer side of the waveguide.

The shield member includes a projection for fixedly supporting the loop portion of the antenna sensor, and is formed of a case body in which a magnetic field voltage detecting circuit element is received and is processed by molding.

Further, the waveguide includes an inserting hole into which the antenna sensor is received, and the antenna sensor includes a neck portion which is fixed in the inserting hole of the waveguide. Also, the microwave oven according to the present invention further includes a shield member having a hole formed thereon for supporting the neck portion of the antenna sensor.

Further, the microwave oven according to the present invention further includes a printed circuit board for fixing the antenna sensor in a manner that the loop portion of the antenna sensor is protruded into the waveguide, and for fixing the wire by grounding the wire. The printed circuit board includes a screw hole through which a screw is passed through so as to fasten the printed circuit board onto an outer side of the waveguide and to ground the antenna sensor at the waveguide; a coupling hole formed on the outer side of the waveguide through which the screw is fastened; a guiding portion for guiding the printed circuit board while the printed circuit board is fitted into the waveguide; and a locking portion for fixing the printed circuit board which is fitted in the waveguide.

As described above, according to the present invention, one end of the antenna sensor is fixed, thus grounded at the outer side of the waveguide.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Hereinafter, an antenna sensor of a magnetic field detecting device of a microwave oven according to a first preferred embodiment of the present invention will be described in greater detail with reference to the accompanied drawings.

Figure 1:
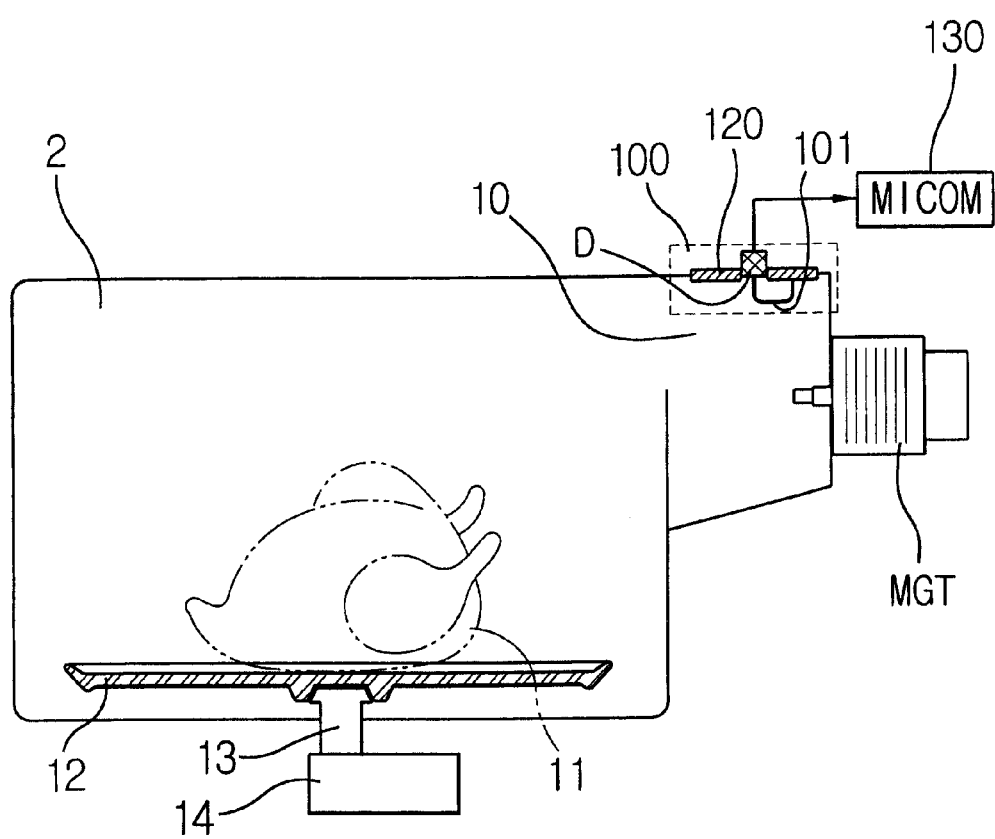
FIG. 1 is a view for schematically showing a magnetic field detecting device of a conventional microwave oven.
Figure 2:
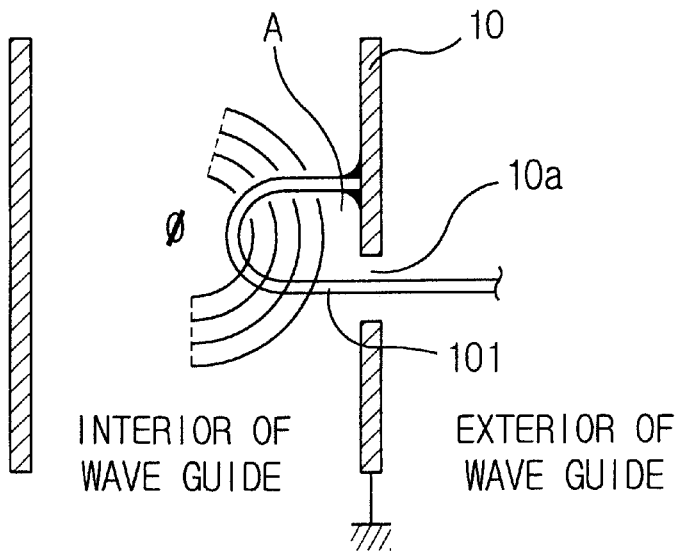
FIG. 2 is a view for explaining operating principle of a conventional magnetic field detecting device.
Figure 3:
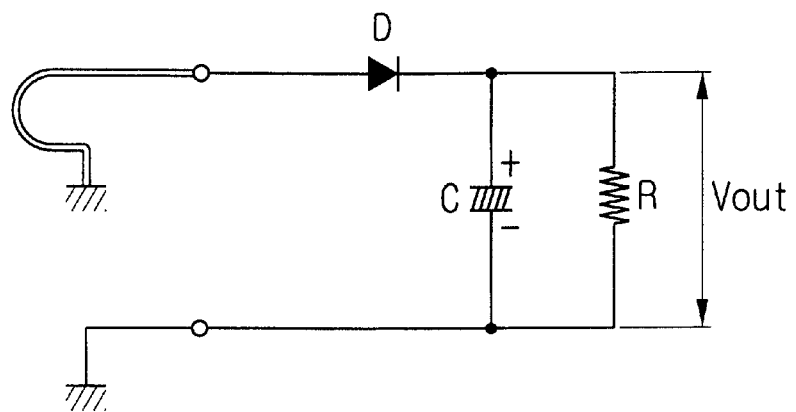
FIG. 3 is a view for showing a voltage switching section of the magnetic field detecting device shown in FIG. 1.
Figure 4A:
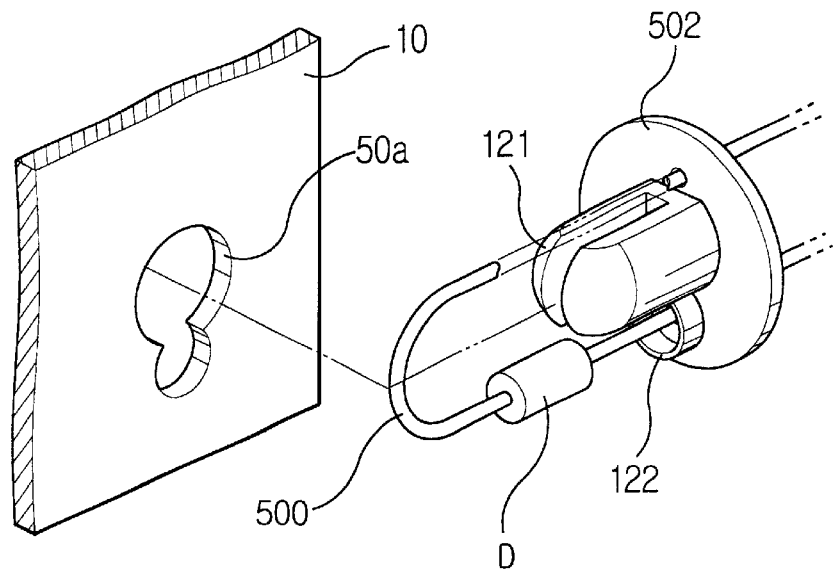
FIGS. 4A and 4B are views for showing an antenna sensor section of a magnetic field detecting device of a microwave oven according to a first preferred embodiment of the present invention.
Figure 4B:
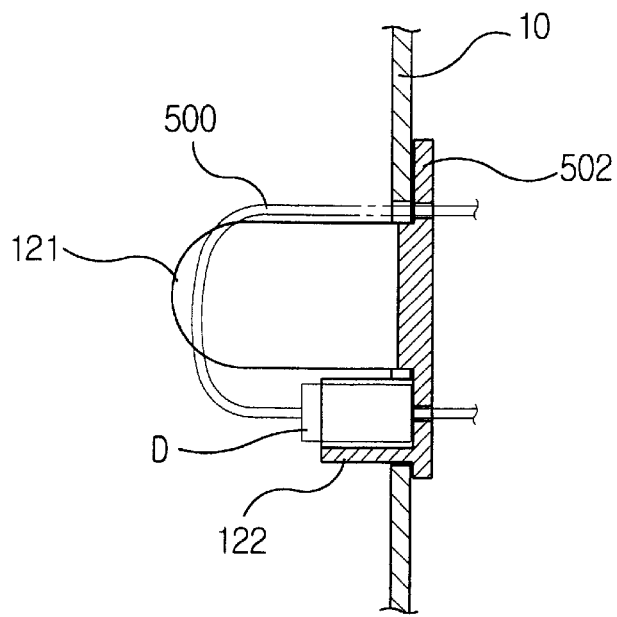

FIGS. 4A and 4B are views for showing an antenna sensor section of a magnetic field detecting device of a microwave oven according to a first preferred embodiment of the present invention.

As shown in FIGS. 4A and 4B, the magnetic detecting device of the microwave oven according to the first preferred embodiment of the present invention includes an antenna sensor 500 inserted into a waveguide 10, and a shield member 502 on which the antenna sensor 500 is fixedly positioned.

A middle portion of the antenna sensor 500 forms a semicircular loop, which is inserted into the waveguide 10 through an inserting hole 50a formed on a wall of the waveguide 10.

The shield member 502 is such formed that the antenna sensor 500 having the loop is inserted into the inserting hole 50a while being positioned on the shield member 502, in a shielded manner so that the possible leakage of inner microwave is prevented.

Meanwhile, the respective ends of the antenna sensor 500 are passed through the shield member 502 outside of the waveguide 10, to induce the voltage generated by the magnetic field in the waveguide 10.

Further, the shield member 502 has a protruding portion 121 for fixedly supporting the loop of the antenna sensor 500. Here, the area formed by the loop of the antenna sensor 500 between the waveguide 10 and the antenna sensor 500 preferably ranges from 153mm$^2$ to 314 mm$^2$.

Further, a diode D is disposed at one end of the loop portion of the antenna sensor 500 to rectify the voltage of stationary wave induced at the antenna sensor 500. The shield member 502 has a flange portion 122 formed thereon to correspond with the diode D. Accordingly, the diode D is positioned in the waveguide 10, while being supported by the flange portion 122 of the shield member 502.

Meanwhile, as shown in FIG. 4B, the inserting hole 50a of the waveguide 10 corresponds with the protruding portion 121 and the flange portion 122 to air-tightly receive the protruding portion 121 and the flange portion 122 of the shield member 502.

In the microwave oven having the magnetic field detecting device constructed as above according to the first preferred embodiment of the present invention, the diode D is disposed at one end of the loop portion of the antenna sensor 500, and the respective ends of the loop portion of the antenna sensor 500 are inserted into the shield member 502 in a manner that the loop portion of the antenna sensor 500 is fitted in the protruding portion 121, and then the diode D are positioned on the flange portion 122 of the shield member 502 so that the antenna sensor 500 is fixed to the shield member 502.

Then by air-tightly inserting the protruding portion 121 and the flange portion 122 into the inserting hole 50a of the waveguide 10, the shield member 502 is assembled with waveguide 10, simply.

Here, in order for the protruding portion 121 and the flange portion 122 to be fixedly inserted into the inserting hole 50a of the waveguide 10, the protruding portion 121 and the flange portion 121 and 122 have a slightly large radius than the inserting hole 50a, and are made of an elastic material.

Secondly, the microwave oven having the magnetic field detecting device according to the second preferred embodiment of the present invention will be described in greater detail with reference to the accompanied drawings.

Figure 5:
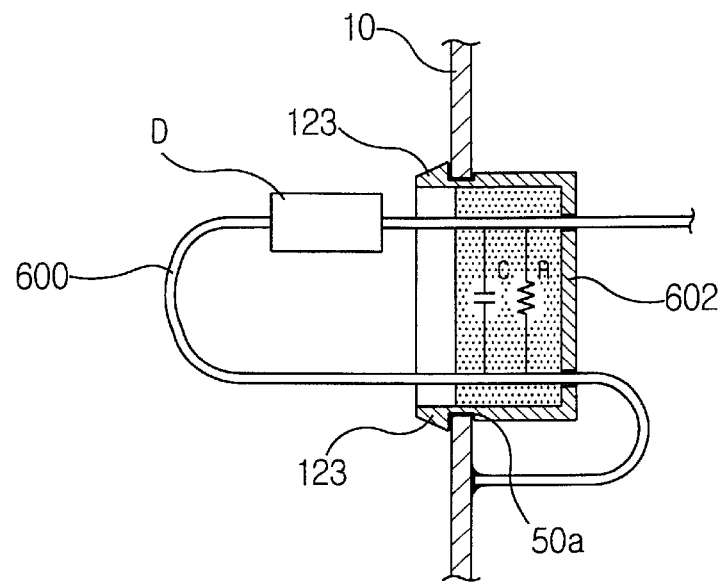
FIG. 5 is a view for showing an antenna sensor section of a magnetic field detecting device of a microwave oven according to a second preferred embodiment of the present invention.

FIG. 5 is a view for showing an antenna sensor section of a magnetic field detecting device of a microwave oven according to a second preferred embodiment of the present invention. As shown in FIG. 5, like the construction described in the first preferred embodiment of the present invention shown in FIGS. 4A and 4B, the magnetic field detecting device according to the second preferred embodiment of the present invention includes an antenna sensor 600 having a middle portion forming a loop, one end of which a diode D is disposed at, and a shield member 602 on which the antenna sensor 600 is positioned and supported, which is air-tightly inserted into the inserting hole 50a of the waveguide 10.

The antenna sensor 600 is inserted into the waveguide 10 through the inserting hole 50a of the waveguide 10 in a state that middle portion thereof forms the semicircular loop. The antenna sensor 600 is protruded into the waveguide 10, to detect the voltage of stationary waves in accordance with the magnetic field from the waveguide 10.

The shield member 602 is air-tightly inserted into the inserting hole 50a while receiving, thus supporting the antenna sensor 600, to prevent leakage of microwaves in the waveguide 10.

The unique feature of the second preferred embodiment of the present invention is that the shield member 602 has a body formed of a hollow case. The respective ends of the antenna sensor 600 are passed through the body of the shield member 602, while the diode D is disposed at one end of the antenna sensor 600. In such a state, a voltage detecting circuit element such as a capacitor C, a resistor R, etc. are installed in the case body of the shield member.

Here, the capacitor C and the resistor R in the shield member 602 smooth the voltage rectified by the diode D into the voltage by charge and discharge operation, and the resistor R outputs the smoothed voltage in accordance with the voltage drop at both ends thereof. Here, the capacity of the capacitor C preferably ranges from 5F to 50 F, and the resistor R preferably ranges from 5 k to 50 k.

Further, it is preferable that at least two locking portions 123 are formed on the outer ends of the shield member 602, which are easy to insert but hardly separable once the locking portions 123 are inserted into the inserting hole 10a of the waveguide 10.

Meanwhile, one end of the antenna sensor 600 extending out from the waveguide 10 through the shield member 602 is grounded at the outer wall of the waveguide 10 by welding. The other end of the antenna sensor 600 extending out from the waveguide 10 is connected with a signal input end of a microcomputer (not shown).

Further, in the case body, the capacitor C and the resistor R are installed in a manner that the capacitor C and the resistor R are not exposed into the waveguide 10 by molding. Meanwhile, as shown in FIG. 5, the diode D is disposed at one end of the antenna sensor 600 and is exposed into the waveguide 10. The diode D, however, may be installed in the case body of the shield member 602 together with the capacitor C and the resistor R while being disposed at the antenna sensor 600 by molding.

In the microwave oven having the magnetic field detecting device according to the second preferred embodiment of the present invention, the diode D is disposed at one end of the loop of the antenna sensor 600, while the antenna sensor 600 is inserted into, thereby being passed through the case body of the shield member 602.

Between one and other ends of the antenna sensor 600 received in the shield member 602, the capacitor C and the resistor R are in-parallel connected, while the inside of the case body of the shield member 602 is sealed from exterior by molding.

Next, the one end of the antenna sensor 600 which is extended out from the waveguide 10 and is passed through the shield member 602, is grounded at the outer wall of the waveguide 600 by welding, while the other end of the antenna sensor 600 is connected with a signal input end of the microcomputer (not shown). Thus, the antenna sensor 600 is installed, simply.

Thirdly, the microwave oven having the magnetic field detecting device according to the third preferred embodiment of the present invention will be described in greater detail with reference to the accompanying drawings.

Figure 6:
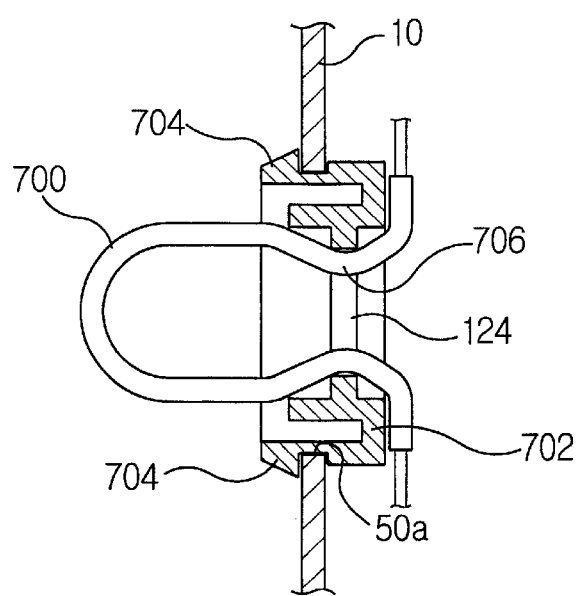
FIG. 6 is a view for showing an antenna sensor section of a magnetic field detecting device of a microwave oven according to a third preferred embodiment of the present invention.

FIG. 6 is a view for showing an antenna sensor section of a magnetic field detecting device of a microwave oven according to a third preferred embodiment of the present invention. As shown in FIG. 6, the magnetic field detecting device according to the third preferred embodiment of the present invention also has the same structure as that of the first preferred embodiment described earlier with reference to FIGS. 4A and 4B, with respect to the feature that the antenna sensor 700 has a loop, and a shield member 702 is air-tightly inserted into an inserting hole 50aof the waveguide 10 while the antenna sensor 700 is positioned and supported on the shield member 702.

Here, the antenna sensor 700 is inserted into the waveguide 10 through the inserting hole 50a of the waveguide 10 in a state that the middle portion thereof forms a semicircular loop. The antenna sensor 700 is exposed into the waveguide 10, to detect the voltage of stationary waves in accordance with the magnetic field.

The shield member 702 is air-tightly inserted into the inserting hole 50a of the waveguide 10, while the antenna sensor 700 is positioned and supported on the shield member 702, to prevent leakage of microwaves in the waveguide 10.

The unique feature of the third embodiment of the present invention is that the shield member 702 has a long hole 124 on the center portion thereof for supporting the antenna sensor 700 at the portion where the antenna sensor 700 is received. The antenna sensor 700 has neck portions 706 which are supported by the long hole 124 while the antenna sensor 700 is received in the center portion of the shield member 702.

Here, the antenna sensor 700 is made of general iron wire. It is more preferable, however, that the antenna sensor 700 is made of a steel of high elasticity so as to permit the neck portions 706 to be tightly supported in the long hole 124 of the shield member 702.

Further, it is preferable that at least two locking portions 704 are formed on an outer end of the shield member 702. Here, the locking portions 704 are such formed that the locking portions 704 are easy to insert to the inserting hole 50a of the waveguide 10, but hardly separable once the same are inserted in the inserting hole 50a.

According to the first and second preferred embodiments, the diode D is disposed at one end of the loop portion of the antenna sensor, and there are capacitor and resistor in the case body of the shield member according to the second preferred embodiment. According to the third preferred embodiment of the present invention, the difference is that the diode, the capacitor, and the resistor (not shown) are connected with the respective ends of the antenna sensor 700, not installed in the shield member 702 of the antenna sensor 700.

Although it is depicted as the diode, the capacitor, and the resistor are connected with the respective ends of the antenna sensor 700 according to the third preferred embodiment, the diode, the capacitor, and the resistor may be installed in the shield member 702 as well.

Fourthly, the microwave oven having the magnetic field detecting device according to the fourth preferred embodiment of the present invention will be described in greater detail with reference to the accompanying drawings.

Figure 7:
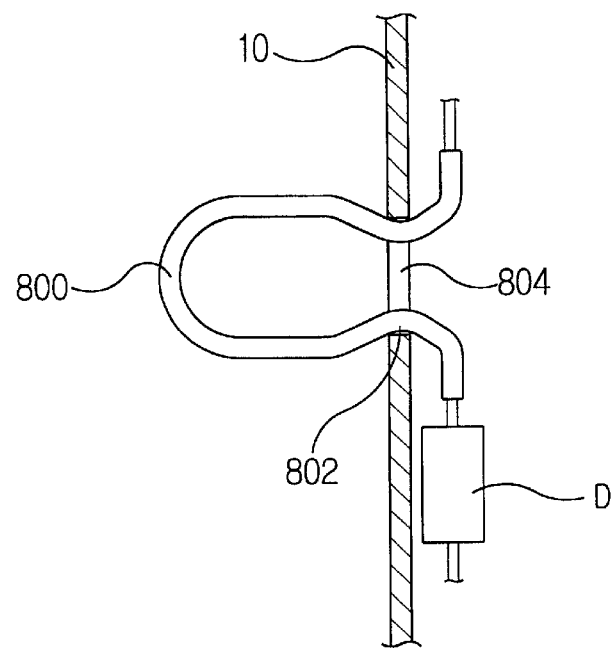
FIG. 7 is a view for showing an antenna sensor section of a magnetic field detecting device of a microwave oven according to a fourth preferred embodiment of the present invention.

FIG. 7 is a view for showing an antenna sensor section of a magnetic field detecting device of a microwave oven according to a fourth preferred embodiment of the present invention. As shown in FIG. 7, the magnetic detecting device according to the fourth preferred embodiment of the present invention, a middle portion of an antenna sensor 800 forms a semicircular loop, and the antenna sensor 800 is inserted into the waveguide 10 through an inserting hole 804 which is formed on the wall of the waveguide 10. The loop of the antenna sensor 800 is exposed into the waveguide 10 to detect the voltage of microwaves in accordance with the magnetic field.

Here, the antenna sensor 800 has neck portions 802 corresponding to the inserting hole 804. The antenna sensor 800 is made of a high elastic steel, and by its high elasticity, the antenna sensor 800 is tightly inserted into the inserting hole 804 of the waveguide 10.

Further, the inserting hole 804 of the waveguide 10 is a long hole formed in a certain direction, so that the neck portions 802 of the antenna sensor 800 are supportingly fitted in the inserting hole 804 when the antenna sensor 800 is connected with the waveguide 10.

Finally, the microwave oven having the magnetic field detecting device according to the fifth preferred embodiment of the present invention will be described in greater detail with reference to the accompanying drawings.

Figure 8A:
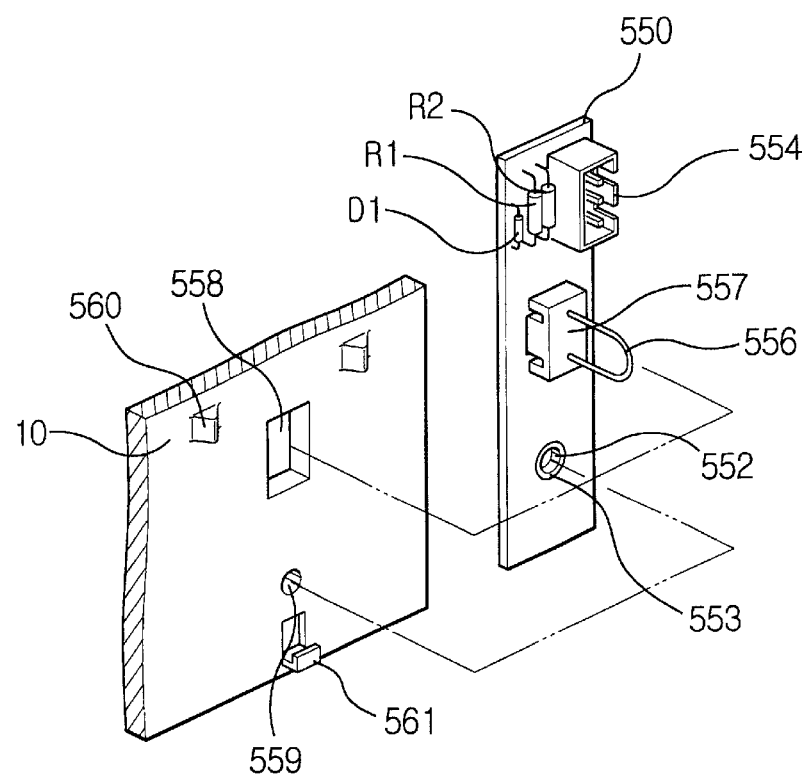
FIGS. 8A and 8B are views for showing an antenna sensor of a magnetic field detecting device of a microwave oven according to a fifth preferred embodiment of the present invention.
Figure 8B:
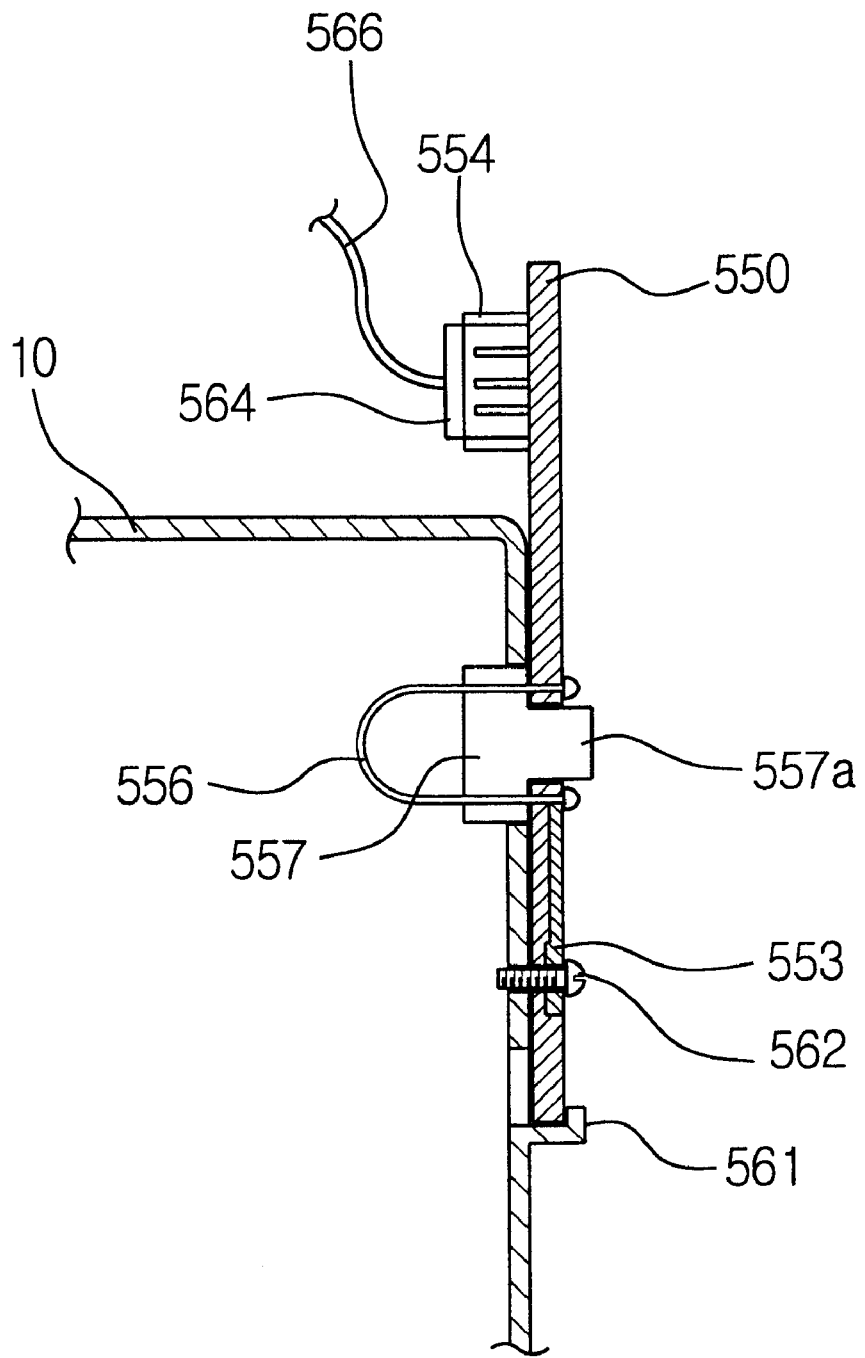

FIGS. 8A and 8B are views for showing an antenna sensor of a magnetic field detecting device of a microwave oven according to a fifth preferred embodiment of the present invention.

As shown in FIGS. 8A and 8B, the magnetic field detecting device according to the fifth preferred embodiment of the present invention includes a printed circuit board 550 having a print circuit formed thereon, an antenna sensor 556 fixedly connected on the printed circuit board 550 to be exposed into the waveguide 10, and a shield member 557 for fixing the antenna sensor 556 onto the printed circuit board 550.

A screw coupling hole 552 is formed on a lower portion of the printed circuit board 550, and a ground terminal 553 is formed around the outer circumference of the screw coupling hole 552 connected with the print circuit, and one end of the antenna sensor 556 is grounded on the ground terminal 553.

Further, a circuit element having a diode D1 and two resistors R1 and R2 is formed on a certain upper portion of the printed circuit board 550, while a connector terminal 554 connected with a wire connector 564 connected with an input wire 566 is formed on other upper portion of the printed circuit board 550.

The wire connector 564 connected with the connector terminal 554 of the printed circuit board 550 is connected with a signal input end of a microcomputer (not shown) through the input wire 566, to apply the voltage of stationary wave in accordance with the magnetic field detected by the antenna sensor 556 to the microcomputer.

Further, on the center portion of the printed circuit board 550, a shield member 557 is fixedly connected with the antenna sensor 556. The middle portion of the antenna sensor 556 forms a loop, and one and other ends of the loop are passed through the shield member 557 and are welded on the rear end of the printed circuit board 550 by soldering. One solder-welded end of the antenna sensor 556 is connected with the ground terminal 553 through a circuit pattern of the corresponding printed circuit board 550, while the other solder-welded end of the antenna sensor 556 is circuit-connected with the diode D1 through the circuit pattern.

Meanwhile, the shield member 557 has at least two hook members 557a on the rear end thereof to be fixed on the printed circuit board 550 while receiving the antenna sensor 556.

Further, the waveguide 10 has an inserting hole 558 formed thereon, through which the antenna sensor 556 and the shield member 557 connected to the center portion of the printed circuit board 550 are inserted. A coupling hole 559 is formed below the inserting hole 558 on the waveguide 10, so that a screw 562 is fastened into the screw coupling hole 552 and the coupling hole 559.

Further, the waveguide 10 has a plurality of guiding projections 560 protruded from the outer wall of the waveguide 10 to guide the printed circuit board 550, so that the printed circuit board 550 can be fixedly coupled with the waveguide 10. A locking projection 561 is protruded from a lower outer wall of the waveguide 10 while being cut away from the lower outer wall of the waveguide 10 and bent, to receive the lower end of the printed circuit board 550 and thus to fix the printed circuit board 550 with respect to the waveguide 10.

Accordingly, in the magnetic field detecting device constructed as above according to the fifth preferred embodiment of the present invention, the shield member 557 receiving the antenna sensor 556 and the connector terminal 554 are connected on the printed circuit board 550, while the diode D and the two resistors R1 and R2 are circuit-connected on the circuit pattern of the printed circuit board 550. Also, the screw coupling hole 553 is formed on the lower portion of the printed circuit board 550.

Meanwhile, the waveguide 10 has a plurality of guiding projections 560 protruded therefrom to fit the size of the printed circuit board 550, and the locking projection 561 which is cut away and bent from the wall surface of the waveguide 10. Further, the waveguide 10 has the inserting hole 558 corresponding to the screw coupling hole 553 of the printed circuit board 550.

Accordingly, as the printed circuit board 550 is connected with the waveguide 10, the printed circuit board 550 is guided by the guiding projections 560 protruded from the waveguide 10, and is fitted into the locking projection 561 of the waveguide 10. In this situation, the antenna sensor 556 fixed on the shield member 557 is inserted through the inserting hole 558 of the waveguide 10, and is protruded into the waveguide 10.

Then by coupling the screw 562 through the screw coupling hole 553 of the printed circuit board 550 and the coupling hole 559 of the waveguide 10, the printed circuit board 550, onto which the antenna sensor 556 is fixed, is finally connected with the waveguide 10.

As described above, in the magnetic field detecting device according to the present invention, since the structure of antenna sensor is simplified, the antenna sensor can be manufactured with less cost than the conventional one. Further, since the antenna sensor is connected with the waveguide by simply inserting the antenna sensor into the waveguide, the manufacturing process also becomes simplified. As a result, the efficiency is improved, and mass-production through the automation is also expected. Further, by improving the coupling way of the magnetic field detecting device, the detected stationary wave data of the magnetic field detecting device has an increased reliability.

While the present invention has been particularly shown and described with reference to the preferred embodiment thereof, it will be understood by those skilled in the art that various changes in form and details may be effected therein without departing from the spirit and scope of the invention as defined by the appended claims.

What is claimed is:

1. A microwave oven comprising an antenna sensor including a loop portion which is protruded into a waveguide of the microwave oven, and a wire whose one end is grounded at the waveguide, the wire of the antenna sensor is grounded at an outer side of the waveguide.

2. The microwave oven as claimed in claim 1, further comprising a shield member for fixing the antenna sensor in a manner that the loop portion of the antenna sensor is protruded into the waveguide, and for fixing one end of the wire in a manner that the one end of the wire is grounded at the outer side of the waveguide.

3. The microwave oven as claimed in claim 2, wherein the shield member includes a projection having a hole thereon for fixing the loop portion of the antenna sensor.

4. The microwave oven as claimed in claim 2, wherein the shield member includes a case body in which a magnetic field voltage detecting circuit element is received and is processed by molding.

5. The microwave oven as claimed in claim 1, wherein the waveguide includes an inserting hole through which the antenna sensor is received in the waveguide, and the antenna sensor further includes a neck portion which is fixed in the inserting hole of the waveguide.

6. The microwave oven as claimed in claim 5, further comprising a shield member having a hole formed thereon for supporting the neck portion of the antenna sensor.

7. The microwave oven as claimed in claim 1, further comprising a printed circuit board for fixing the antenna sensor in a manner that the loop portion of the antenna sensor is protruded into the waveguide, and for fixing the wire by grounding the wire.

8. The microwave oven as claimed in claim 7, wherein the printed circuit board includes:

a screw hole through which a screw is passed through so as to fasten the printed circuit board onto an outer side of the waveguide and to ground the antenna sensor at the waveguide;

a coupling hole formed on the outer side of the waveguide through which the screw is fastened;

a guiding portion for guiding the printed circuit board while the printed circuit board is fitted into the waveguide; and a locking portion for fixing the printed circuit board which is fitted in the waveguide.

* * * * *